March 28, 1939.  C. H. WILL  2,152,338
WINDSHIELD DEFROSTER
Filed March 20, 1937  2 Sheets-Sheet 1

INVENTOR
CARL H. WILL
BY Paul, Paul & Moore
ATTORNEYS

March 28, 1939.  C. H. WILL  2,152,338
WINDSHIELD DEFROSTER
Filed March 20, 1937  2 Sheets-Sheet 2

INVENTOR
CARL H. WILL
BY Paul, Paul Moore
ATTORNEYS

Patented Mar. 28, 1939

2,152,338

UNITED STATES PATENT OFFICE 2,152,338

WINDSHIELD DEFROSTER

Carl H. Will, Minneapolis, Minn., assignor to Tropic-Aire, Incorporated, Minneapolis, Minn., a corporation of Delaware Application March 20, 1937, Serial No. 132,065

2 Claims. (Cl. 20—40.5)

This invention relates to new and useful improvements in windshield defrosters and more particularly to the type disclosed in the pending application of Henry W. Fink, Serial No. 117,437, filed December 24, 1936.

An object of the present invention is to provide a windshield defroster comprising an air circulator adapted to receive heated air from a suitable source such, for example, as the usual heater of the automobile, and said air circulator having one end of a conduit connected thereto, the opposite end of which is connected to a Y-fitting to which the corresponding ends of a pair of conduits are connected, and a unique nozzle being connected to the upper end of each of said branch conduits having means for securing them in position upon the instrument panel in spaced relation, whereby heated air may be directed against the surface of the windshield at spaced points, thereby to defrost substantially the entire surface of the windshield.

A further object of the invention resides in the unique construction of the air deflecting nozzles supported upon the instrument panel for diverting the heated air against the surface of the windshield, each of said nozzles including a lower section comprising a flat-like hollow body having a cylindrical opening adapted to be connected to a conduit, and the opposite end of said body being adapted to be fitted through an elongated opening in the wall of the instrument panel and projecting thereabove to provide a centering means for a deflector fitted against the upper surface of the instrument panel, and means being provided for securing the deflector to said body portion with a wall of the instrument panel clamped therebetween, thereby to secure the nozzle in position upon the instrument panel.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Figure 1:
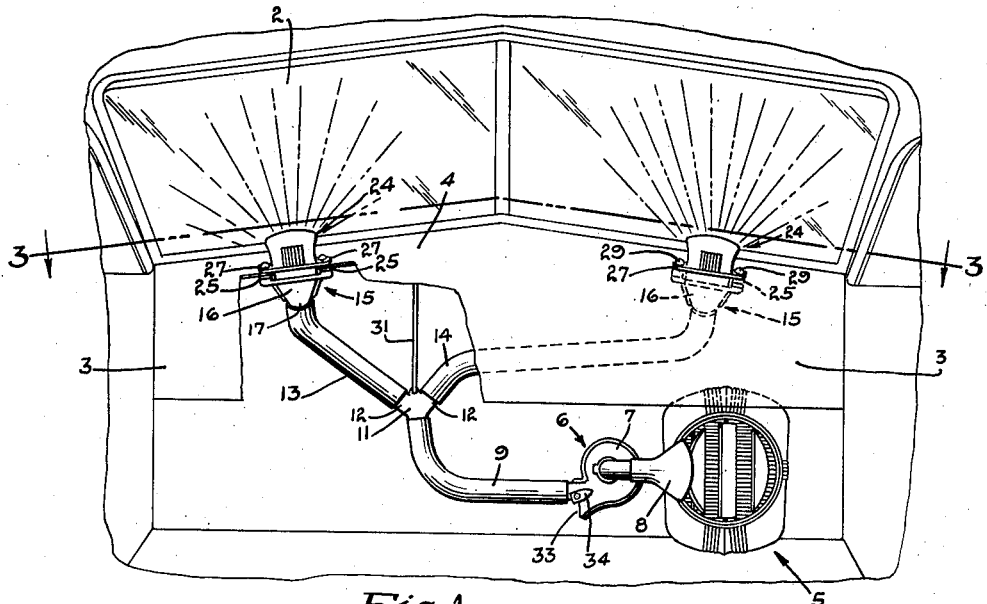
Figure 1 is a view diagrammatically illustrating the front portion of the interior of a vehicle body and the preferred arrangement of the defroster nozzles on the instrument panel.
Figure 3:
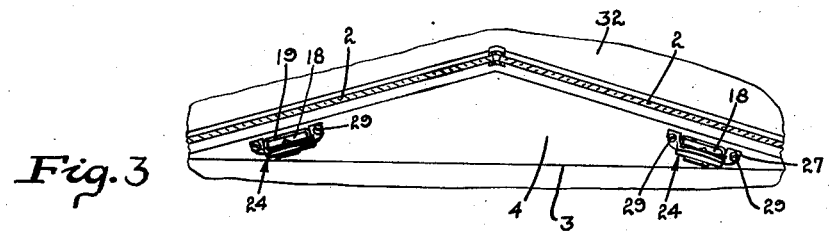
Figure 3 is a sectional plan view on the line 3—3 of Figure 1.
Figures 2, 4:
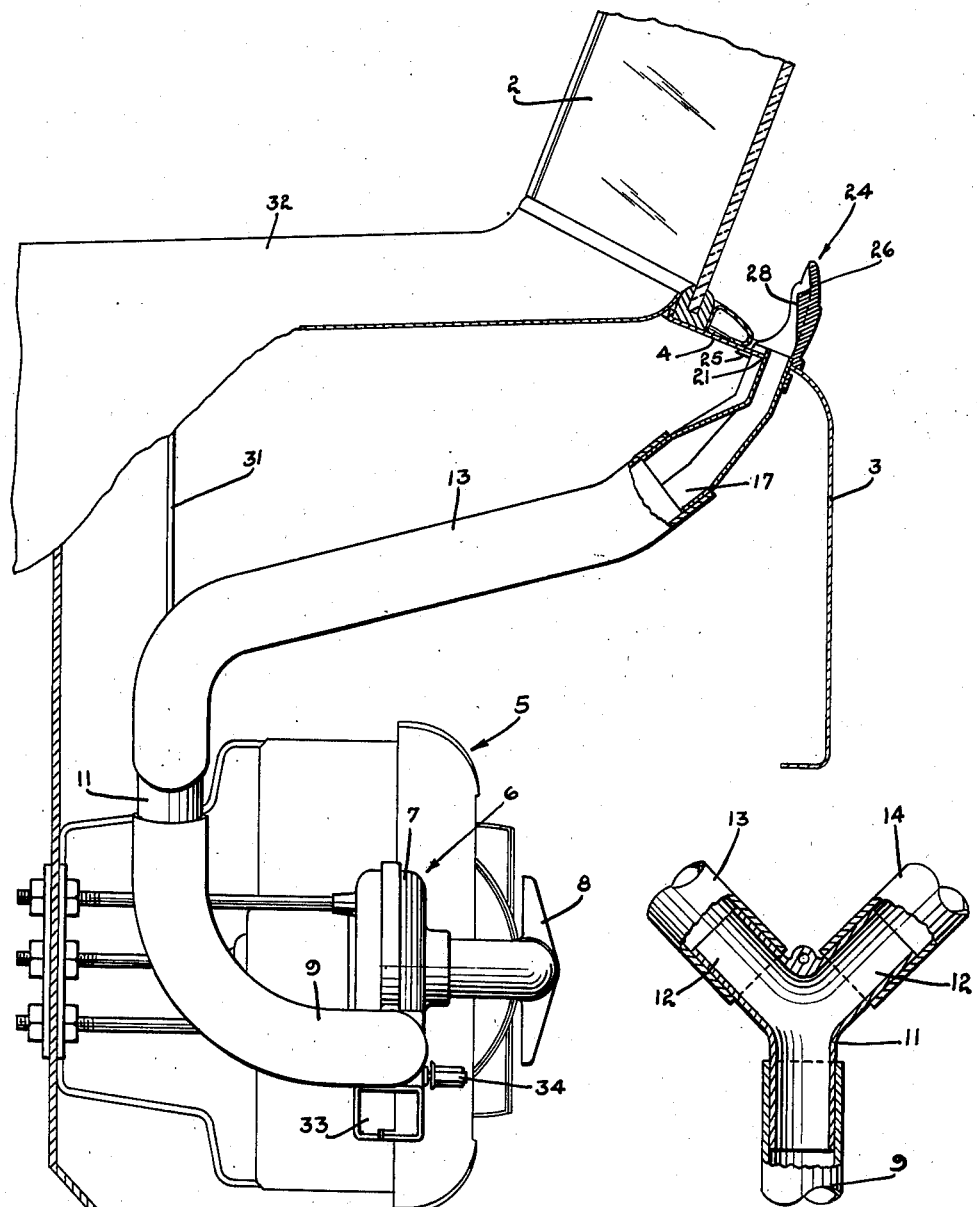
Figure 2 is an enlarged sectional elevation of Figure 1, showing the manner of supporting the air circulator in position adjacent to the heater.
Figure 4 is an enlarged detail sectional view showing the fitting to which the conduits of the nozzles are connected.

In the selected embodiment of the invention here shown, there is illustrated in Figures 1 and 2, a portion of an automotive vehicle comprising a windshield 2, instrument panel 3 having an upper forwardly extending wall portion 4, and a conventional heater, generally indicated by the numeral 5.

An air circulator, generally indicated by the numeral 6, is shown and described in detail in the hereinbefore mentioned pending application, and it is therefore thought unnecessary to herein show and describe the same in detail. Briefly stated, however, the heater comprises a suitable housing 8 having a motor driven blower (not shown) mounted therein for drawing heated air through the nozzle 8 and circulating it through a conduit 9, provided at its upper end with a suitable Y-fitting 11. The legs 12 of the branch fitting 11 have suitable conduits 13 and 14 connected thereto. The upper ends of the conduits 13 and 14 are connected to a pair of nozzles, generally indicated by the numeral 15. These nozzles are alike in construction and it will therefore be necessary to describe but one in detail.

An important feature of the invention resides in the unique construction of the nozzle 15, whereby it may be conveniently secured to the upper forwardly inclined wall 4 of the instrument panel, as clearly illustrated in Figures 1 and 2.

The nozzle 15 comprises a body portion 16 formed with a cylindrical intake opening 17 adapted to be connected to one of the supply conduits 13 or 14. The upper end of the body 16 is flattened to provide an elongated opening 18, the wall 19 of which is adapted to be received in a correspondingly shaped opening 21, provided in the wall 4 of the instrument panel. The upper edge 22 of the wall 19 projects above the upper surface of the wall 4 of the instrument panel, as best shown at 23 in Figure 5, whereby said projecting wall portion provides a dowel for centering a suitable deflector, generally indicated by the numeral 24.

Figures 5, 6:
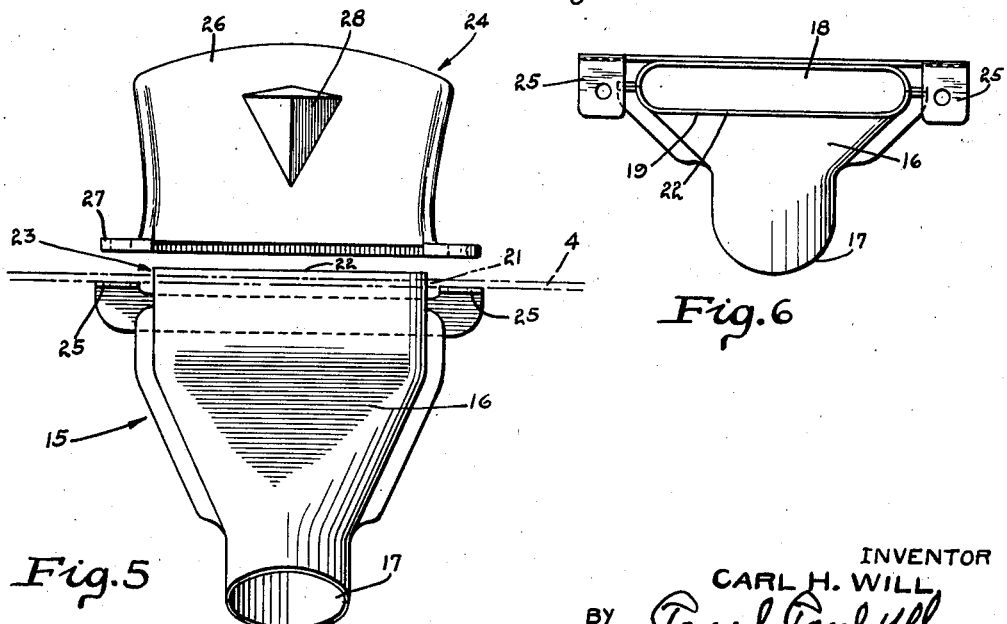
Figure 5 is an enlarged detail view showing the construction of the nozzles and the manner of clamping a wall of the instrument panel therebetween.
Figure 6 is a top view of the lower section of one of the nozzles.

The body portion 16 is provided with oppositely projecting apertured ears 25 adapted to be seated against the bottom surface of the wall 4, as indicated in Figure 5. The deflector 24 comprises an upwardly curved wall portion 26 provided at its bottom with oppositely disposed apertured ears 27 adapted to be superimposed over the ears 25 of the body 16, whereby a portion of the wall 4 of the instrument panel may be clamped between the ears 25 and 27 of the body 16 and deflector 24, respectively, as will be clearly understood by reference to Figure 5. The deflector 24 is shown provided on the surface thereof adjacent the windshield, with an air spreader 28 in the form of a V-shaped lug, preferably integrally formed with the wall of the deflector 24. This air spreader serves to outwardly direct a portion of the air delivered against the deflector 24, as will be clearly understood by reference to Figures 1 and 2. If desired, more than one deflector lug or rib 28 may be provided without departing from the scope of the invention.

The nozzles 15 are preferably arranged as shown in Figure 1, whereby one nozzle is positioned substantially in front of the driver, and the other in front of the passenger seat adjacent to the driver. By thus arranging the nozzles 15, they will cooperate to defrost substantially the entire surface of the windshield.

By constructing each nozzle 15 of two sections, as best illustrated in Figure 5, they may readily be secured in position upon the forwardly extending wall 4 of the instrument panel, by simply providing elongated apertures therein adapted to receive the upper wall portion 19 of the body 16, and securing together the two sections by suitable bolts 29, received in the aligned apertures provided in the lugs 25 and 27, respectively, of the body 16 and deflector 24, and similar apertures provided in the wall 4 of the instrument panel. By thus mounting the nozzles on the instrument panel, they will present a very neat appearance, as only the upper portions 24 thereof are visible from within the interior of the vehicle. Their lower portions 16 and the branch conduits 13 and 14 are concealed back of the instrument panel, as will be readily understood by reference to Figures 1 and 2. When the defroster is not required, as in the summer months, the branch conduits 13 and 14 may readily be detached from the nozzles, and the air circulator may also be removed and put away in storage until again needed. A suitable support 31 is preferably provided for supporting the Y-fitting 11 in the position shown in Figure 1. The upper end of this support may be connected to the upper wall of the cowl 32 by suitable means, not shown.

As shown in Figure 1, the housing 7 of the air circulator 6 is preferably provided with an auxiliary discharge opening 33, and has a control valve 34 for controlling the flow of air therefrom through the conduit 9 or auxiliary opening 33, or both. When the apparatus is not needed for defrosting the windshield, the valve 34 may be closed to the conduit 9, whereby all of the hot air drawn into the blower housing 6 through the nozzle 8, may be diverted downwardly in a direction towards the driver's feet.

I claim as my invention:

1. A nozzle for a defroster comprising a lower body portion having an intake opening adapted to be connected to a suitable source of heat, said body portion having an elongated flattened discharge opening, the wall of which is adapted to be inserted through a correspondingly shaped opening in the wall of the instrument panel of a vehicle, and a deflector adapted to be fitted against the upper portion of the instrument panel and having means for securing it to said lower body portion, whereby the instrument panel is clamped between said body and deflector, thereby to secure the nozzle in position adjacent to the windshield.

2. A nozzle for a defroster comprising a lower body portion having an intake opening adapted to be connected to a suitable source of heat, said body portion having an elongated discharge opening, the wall of which is adapted to be inserted through a correspondingly shaped opening provided in the wall of the instrument panel of the vehicle and projecting thereabove to provide a centering dowel, a deflector adapted to be fitted against the upper portion of the instrument panel and having a socket for receiving said centering dowel, and means for securing the deflector to said lower body portion, whereby a portion of the instrument panel is clamped between said body portion and the deflector, thereby to secure the nozzle in position adjacent to the windshield and whereby said body portion is concealed from view.

CARL H. WILL.